(12) United States Patent
Watabe

(10) Patent No.: US 6,292,446 B1
(45) Date of Patent: Sep. 18, 2001

(54) OPTICAL DISK APPARATUS FOR REPRODUCING INFORMATION BY SHIFTING THE LIGHT BEAM POSITION AWAY FROM THE CENTER LINE OF THE PREPIT ARRAYS OF AN OPTICAL DISK

(75) Inventor: Kazuo Watabe, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/272,169

(22) Filed: Mar. 18, 1999

(30) Foreign Application Priority Data

Mar. 20, 1998 (JP) .................................................. 10-072301

(51) Int. Cl.$^7$ ...................................................... G11B 7/00
(52) U.S. Cl. ................ 369/53.2; 369/275.3; 369/44.41; 369/59.13
(58) Field of Search ............................. 369/275.1, 275.2, 369/275.3, 275.4, 44.26, 44.27

(56) References Cited

U.S. PATENT DOCUMENTS

| | | |
|---|---|---|
| 5,003,525 | 3/1991 | Shimamoto et al. . |
| 5,168,490 | 12/1992 | Braat . |
| 5,872,767 * | 2/1999 | Nagai et al. ........................ 369/275.3 |
| 5,933,410 * | 8/1999 | Nakane et al. ..................... 369/275.3 |
| 5,936,932 * | 8/1999 | Nakane et al. ..................... 369/275.3 |
| 6,118,752 * | 9/2000 | Miyagawa et al. ................ 369/275.3 |
| 6,147,961 * | 11/2000 | Nagasawa et al. ................ 369/275.3 |

FOREIGN PATENT DOCUMENTS 0 829 854 A1   2/1993  (EP) .

\* cited by examiner

Primary Examiner—Nabil Hindi
(74) Attorney, Agent, or Firm—Foley & Lardner

(57) ABSTRACT

An optical disk apparatus is capable of reproducing information from an optical disk 10. The optical disk apparatus mainly includes an illuminating unit which is formed from a semiconductor laser 14, a collimator lens 15, a polarization light beam splitter (PBS) 16 and a ½-quarter-wave plate 17, as well as an objective lens 18, that focuses a light beam onto the optical disk 10; a two-segment split photo detector 21 which detects the light beam reflected by the optical disk 10; and a signal processing circuit 27 which processes a signal obtained by the two-segment split photo detector 21 to output a signal for reproduction. Here, the optical disk 10 has a recording region on which recording information can be stored along a first line and a header field on which reproducible information is stored along a second line, the second line being shifted from the first line a predetermined distance, the illuminating unit focusing the light beam along the first line, and the two-segment split photo detector 21 having two detecting areas 22a and 22b on opposite sides of a line parallel to the reflected image of the first line position. The signal processing circuit 27 is capable of processing a difference and a sum signal by using values detected in the detecting areas 22a and 22b, and it outputs one of those to serve as a playback signal reflecting a characteristic of the optical disk 10.

13 Claims, 8 Drawing Sheets

OPTICAL DISK APPARATUS FOR REPRODUCING INFORMATION BY SHIFTING THE LIGHT BEAM POSITION AWAY FROM THE CENTER LINE OF THE PREPIT ARRAYS OF AN OPTICAL DISK

BACKGROUND

The present invention relates to an optical disk apparatus for optically reproducing information from an optical disk by focusing a light beam onto the optical disk upon which information is recorded, and more particularly to an optical disk apparatus for performing reproduction while moving a beam spot over an optical disk, the beam being shifted in position away from the center line of the prepit arrays in the radial direction relative to the center of the optical disk.

A DVD-RAM (Digital Versatile Disk-Random Access Memory) has been developed as one of several large-capacity rewritable optical disks, and the details of a standard for this DVD-RAM are described in a book named "DVD-Specifications for Rewritable Disc version 1.0". The book prescribes address information and the like must be pre-recorded in a header field as prepits. "Prepits" are information-containing pit arrays encoded with sector address information, permanently formed into the surface of the disk, and preceding the recording regions. The book also prescribes employing in recording regions both grooves and the lands that separate the grooves, which are created on the disk beforehand, and recording user information, such as image data, audio data or the like on both the lands and the grooves. Accordingly, it is required that the prepits must be playbacked from extensions of both a land track and a groove track in the same way.

FIG. 1 is a diagram showing an example disk format for this current type of DVD-RAM. The recording regions 42 for use in recording various kinds of the user information (such as image data and sound data, etc.) are formed by the lands 54 and the grooves 52, and the header field 44 in which the address information has been pre-recorded are formed by arrays of pits formed as the prepits 8. The center lines C1, D1 of these prepit arrays 8 are shifted radially (with respect to the center of the optical disk 10) in a manner such that the center lines C1, D1 are placed on extension lines of the boundaries between adjoining lands 54 and grooves 52, as is shown in FIG. 1.

Therefore, a beam spot 6 generated by focusing a light beam onto the optical disk 10 scans along the center lines of the lands 54 and the grooves 52 in the recording region 42, and the beam spot 6 also scans the prepit arrays and in the header field 44, shifted from prepit array center lines by a predetermined distance, a pitch tp/2 which is one-half of the track pitch tp.

The light beam reflected from the optical disk 10 is focused upon a photo detector which performs information reproduction from the land track and the groove track as well as from the prepit arrays. The photo detector has a light-receiving surface which is divided into two light-receiving segments by a divisional line extending tangentially parallel to the tracks of the optical disk 10, and the photo detector is disposed such that the divisional line passes approximately through the center of a zero-order diffracted beam of the reflected light beam. With regard to the information reproduction from the prepit arrays, a "push-pull" signal, which corresponds to the difference between output signals derived from the split light-receiving segments of the photo detector, is generated as the information playback signal. This playback signal is then processed by a signal processing circuit that then presents the information recorded within the prepit arrays as well as that recorded within the land track and the groove track.

To meet demands that such rewritable optical disks should achieve greater storage capacity, a high-density DVD-RAM that can record information at even higher areal densities than have been achieved by the current DVD-RAMs is under development. In this high-density DVD-RAM, to increase its areal recording density, the track pitch must be made narrower than that of current DVD-RAMs. Where the reproduction of information from a prepit array on a high-density DVD-RAM is carried out using a light beam by letting the beam spot be offset by a predetermined distance from the center line of the prepit array, as is done with the current DVD-RAM, this narrowing of the track pitch causes the distance between the center point of the beam spot and the center line of the prepit array to decrease so that the resulting distance is less than that employed in the current DVD-RAMs.

When deriving the push-pull signal from such a high-density DVD-RAM in the same manner as when doing so from the current DVD-RAM, it has been found the less the distance between the center point of the beam spot and the center line of the prepit array, the less the amplitude of the push-pull signal, and when the center of the beam spot scans a location just overlying the center line of the pre-pit array, the resulting amplitude of the push-pull signal becomes essentially zero. Therefore, when reproducing high density DVD-RAMs with the track pitch narrowed, the push-pull signal decreases in amplitude to the point where there can be difficulty in the reproduction of the information and, possibly, errors.

Accordingly, it is an object of the present invention to solve the above-mentioned problem by providing an optical disk apparatus capable of producing an information reproduction signal of greater signal amplitude even when used with a plurality of types of optical disks that differ in track pitch and in recording density, when reproducing information by using a light beam to scan certain lines spaced apart by a predefined distance from the center of a mark array having an optical phase difference relative to non-mark regions, such as those where prepit arrays are located.

SUMMARY OF THE INVENTION

The present invention has been made in view of the above-mentioned circumstances and is intended to solve the above-mentioned problems. Additional purposes and advantages of the invention are apparent from the following description and may be learned by practicing the invention.

To solve these problems, the present invention provides an optical disk apparatus for reproducing information from an optical recording medium, including a light emitting unit that focuses a light beam onto the optical recording medium, a detecting unit that detects the light beam reflected by the optical recording medium, a processing unit that processes a signal generated by the detecting unit and outputs a processed signal that reproduces the recorded information, wherein the optical recording medium has reproducible information formed as mark arrays which have an optical phase difference with respect to adjacent portions of the mark arrays, the light emitting unit focuses the light beam along a line shifted away from the center lines of the mark arrays by a predetermined value in a radial direction with respect to the center of the optical recording medium, the detecting unit has a detecting surface which is divided into at least two detecting areas by at least one divisional line parallel to the center line of the mark arrays, the processing unit is capable of computing the difference between and the sum of signals originating in the detecting areas, and outputs as the processed signal one or the other of those computed values to reproduce information of the mark arrays in accordance with a characteristic of the optical recording medium.

The present invention further provides an optical disk apparatus for reproducing information from an optical recording medium, including a light emitting unit that focuses a light beam onto the optical recording medium, a detecting unit that detects the light beam reflected by the optical recording medium, a processing unit that processes a signal generated by the detecting unit and outputs a processed signal that reproduces the recorded information, wherein the optical recording medium has a first area on which rewritable information can be stored along a first line and a second area on which reproducible information is stored along second lines formed as mark arrays which have an optical phase difference with respect to adjacent portions of the mark arrays, the second lines being shifted away from the first line by a predetermined distance, the light emitting unit focuses the light beam along the first line, the detecting unit has a detecting surface which is divided into at least two detecting areas by at least one divisional line parallel to the first line and the second lines, and the processing unit is capable of computing the difference between and the sum of signals originating in the detecting areas, and outputs as the processed signal one of the difference and the sum signal by taking into consideration the difference between the first and second areas.

In accordance with another aspect of the invention, the processing unit may output a difference signal as the processed signal when the optical recording medium has the characteristic in which the predetermined distance is longer than a predetermined value, and may output a sum signal as the processed signal in the case when the optical recording medium has the characteristic in which the predetermined distance is shorter than the predetermined value. Here, the predetermined value may be approximately 0.31 to 0.37 micrometer.

In accordance with another aspect of the invention, the processing unit may output as the processed signal the difference signal in the case when the optical recording medium has the characteristic in which the distance between the adjacent tracks is a predetermined value, and may output the sum signal as the processed signal in the case when the optical recording medium has the characteristic in which the distance between the adjacent tracks is shorter than the predetermined value.

The present invention also provides a method of reproducing information from an optical recording medium, the optical recording medium having a first area on which recordable information can be stored along a first line and a second area on which reproduction control information is stored along a second line, the second line spaced apart from the first line by a predetermined distance, including the steps of focusing a light beam onto the optical recording medium, detecting the intensity of the light beam reflected by the optical recording medium, and processing the light intensities obtained by the detection step to extract the information for reproduction, wherein the focusing step focuses the light beam along the first line, the detecting step detects the reflected light beam in a plurality of detecting areas which are on opposite sides of a reflected image of the first line location, and the processing step computes the difference between and the sum of the light intensities detected in the detecting step and presents the sum or the difference as the information for reproduction in accordance with a characteristic of the optical recording medium.

The present invention further provides a method of reproducing information from an optical recording medium, the optical recording medium having a first area on which recordable information can be stored along a first line and a second area on which reproduction control information is stored along a second line, the second line spaced apart from the first line by a predetermined distance, including the steps of focusing a light beam onto the optical recording medium, detecting the intensity of the light beam reflected by the optical recording medium, processing the light intensities obtained by the detection step to extract the information for reproduction, wherein the focusing step focuses the light beam along the first line, the detecting step detects the reflected light beam in a plurality of detecting areas which are on opposite sides of a reflected image of the first line location, and the processing step computes the difference between and the sum of the light intensities detected in the detecting step and presents the sum or the difference as the information for reproduction in accordance with a characteristic of the optical recording medium.

BRIEF DESCRIPTION OF THE DRAWINGS

The accompanying drawings, which are incorporated in and constitute a part of this specification, illustrate several embodiments of the invention and, together with the description, serve to explain the principles of the invention.

DESCRIPTION OF PREFERRED EMBODIMENTS

An embodiment of an optical disk apparatus of the present invention will now be described in more detail with reference to the accompanying drawings.

Figure 2:
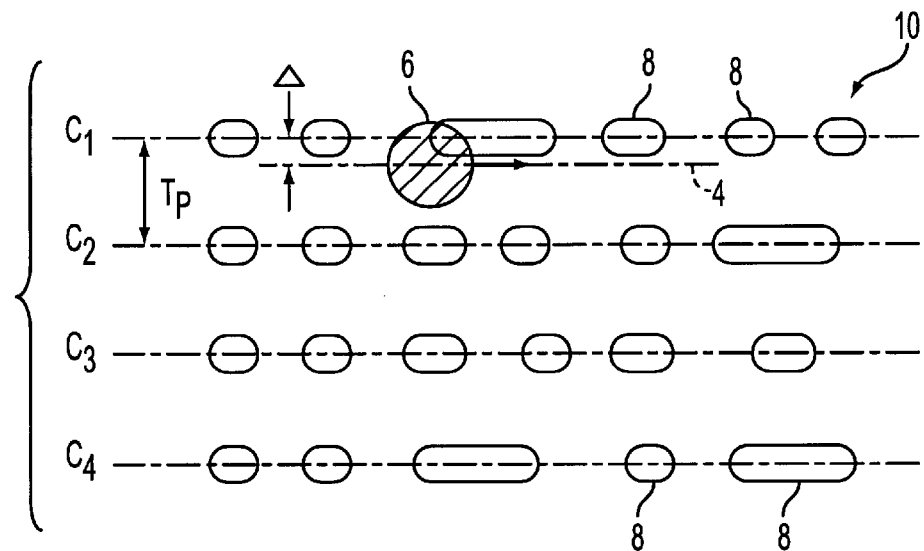
FIG. 2 is a diagram illustrating the relation between the prepits and the light beam spot as it scans an optical disk incorporating the present invention.

FIG. 2 illustrates how playback is performed from a mark array, such as a pit array, on an optical disk 10 placed into an optical disk apparatus that is designed in accordance with the present invention. As shown in FIG. 2, the pit arrays are formed along tracks C1, C2, C3, and C4 having a track pitch "Tp". If the optical disk is a DVD-RAM, these pit arrays constitute a "header field" containing, for example, address information or the like prerecorded. The track pitch Tp in this case is 1.48 μm. When reproducing the information recorded on the optical disk, an optical head is used to focus and move a light beam upon and over this optical disk to form a beam spot 6, as is shown in FIG. 2.

Here, the beam spot 6 scans not along the pit array 8 center lines C1, C2, C3, and C4 but along a lines 4 and other similarly situated lines (not shown) that are each shifted by a predetermined distance Δ from a corresponding one of the pit array center lines Cn in a radial direction (a vertical direction in FIG. 2) with respect to the center of the optical disk. In the header field (where the prepit arrays are formed) of the DVD-RAM shown in FIG. 2, the beam spot 6 is shifted by an amount (that is approximately 0.37 μm.

Figure 3:
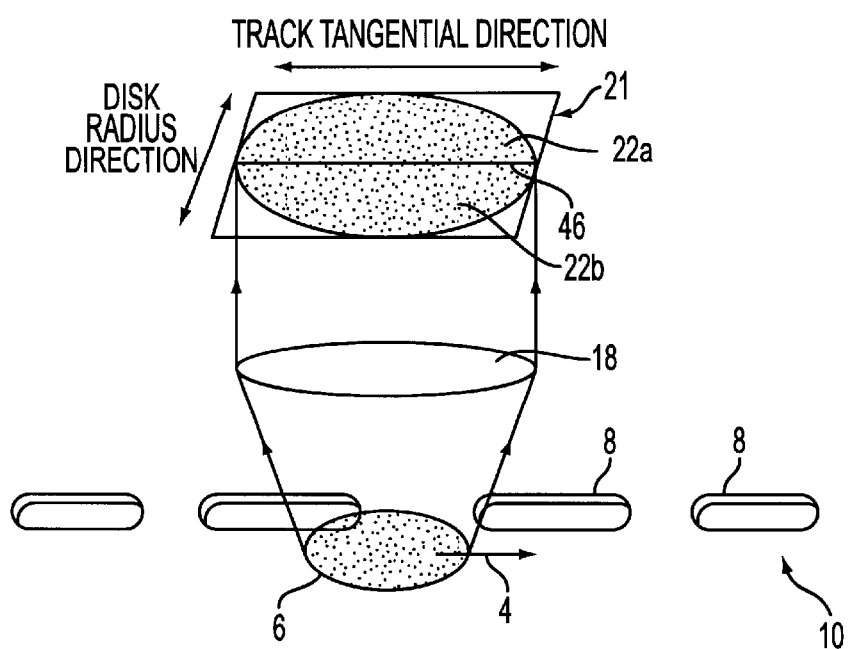
FIG. 3 is a diagram illustrating the relationship of the prepits to the beam spot on the optical disk as well as their relationship to the photo detector in the present invention.

FIG. 3 indicates the relative arrangement of one pit array 8 on the optical disk 10 and the beam spot 6, as well as a two-segment split photo detector 21 of the present invention. Reflected light from the beam spot 6 focused upon the optical disk 10 is trimmed of its margin by the aperture of an objective lens 18. Thereafter, the resultant reflected light is guided to the two-segment split photo detector 21 by an optical system (not shown herein). This two-segment split photo detector 21 is designed so that its light receiving plane is divided into two areas 22a and 22b by a divisional line 46 that extends parallel to a tangent to the tracks, as shown in FIG. 3.

In a currently existing DVD-RAM, the difference between the output signals produced by the two areas 22a and 22b of the two-segment split photo detector is computed and is used as the playback signal from the prepit array 8. This difference can be computed by subtracting one output signal from the other, or it can be produced by feeding the two signals, in push-pull manner, into the inverted and non-inverted inputs of an analog differential amplifier.

In contrast to this, the present invention contemplates summing the output signals to produce an alternative playback signal, and the sum and difference signals may then be selectively used as the playback signal from the prepit array.

A detailed explanation of some specific features of the present invention will be given with reference to FIGS. 4 to 9.

Figure 4:
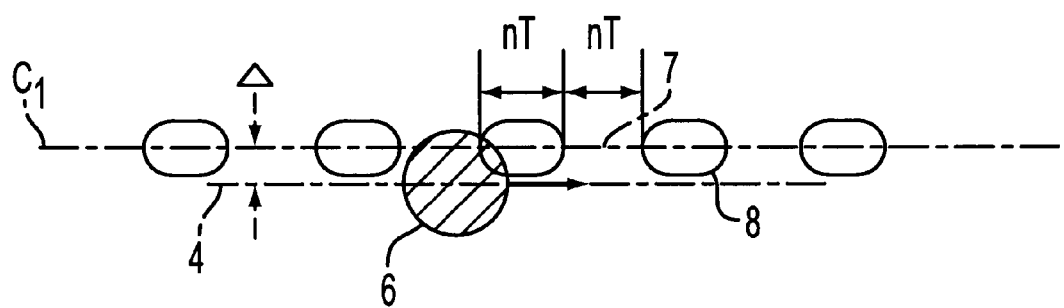
FIG. 4 is a diagram illustrating prepits spaced apart to generate an nT/nT single-frequency signal on a DVD-RAM along with the manner in which the beam spot reproduces that signal optically.

FIG. 4 is a plan view of a prepit array 8 designed to represent an nT/nT single-frequency signal on the DVD-RAM surface. The light beam 6 is also shown. Here, "nT/nT" means that the length of the playback signal of the pit is "nT" and the space between each playback signal (non-pit part) is "nT" in the specified scanning velocity, where "T" is a channel clock interval. In the current DVD-RAM, a light beam is focused to form the beam spot 6 which travels along a line 4 that is shifted the distance Δ in a radial direction from the center line C1 of the prepit array 8, so that the reflected light beam can reproduce the information encoded into the prepit array 8.

Figure 5:
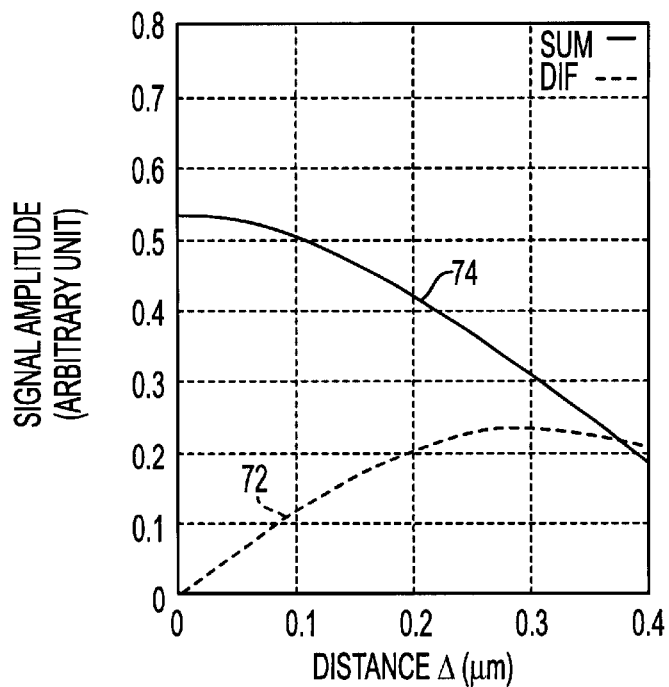
FIG. 5 is a diagram illustrating the reproduction signal amplitude when a difference and when a sum signal is derived from prepits arranged on a disk to generate a 3T/3T single-frequency signal on a current DVD-RAM with respect to the distance between the beam spot and the center line of the prepits.

FIG. 5 is a graph illustrating the relationship between the signal amplitude of the playback signal and the distance Δ between the beam spot path line 4 and the center line C1 of the prepit array 8. In this simulation, the optical disk playback laser is assumed to have a wavelength of 640 nm, the numerical aperture of the objective lens 18 is 0.6, and a two-segment split photo detector 21 is used to reproduce information from a prepit array 8 that generates a 3T/3T single-frequency signal. The pit length is 0.615 μm and the pit depth is 70 nm. The signal was recorded with an (8-16) modulation scheme, the same modulation scheme that is used in current DVD-RAMs, with a bit length of 0.41 μm. The dotted line 72 denotes the amplitude of the differential output signal derived from the two light-receiving areas 22a and 22b of the two-segment split photo detector 21, and the solid line 74 denotes the amplitude of the sum signal derived therefrom.

As can be seen in FIG. 5, when the beam spot 6 scans along a line 4 exactly overlying the prepit array centerline C1 (meaning (Δ=0 on FIG. 5), the amplitude of the difference signal is practically zero, and the amplitude of the sum signal is at a maximal value. As the distance Δ increases in value, the amplitude of the sum signal decreases while the amplitude of the difference signal rises to a maximum value at the vicinity of Δ=0.3 μm and then it decreases slightly as the distance Δ increases to more than 0.3 μm. This tendency indicates that the amplitude of the sum signal is more advantageous to be used for playback in cases where the distance Δ is less than it is where the two curves intersect, while the amplitude of the difference signal is more advantageous in cases where the distance Δ is more than it is at the intersection point.

In this example, the curves of the differential and sum signal amplitude intersect in vicinity of the distance Δ=0.37 μm, which just meets the standard of the current DVD-RAM. Accordingly, a playback signal of greater amplitude may be obtained through the use of the difference signal derived from the prepit array 8 when the distance Δ is more than 0.37 μm. Alternatively, when the distance Δ is less than 0.37 μm, the sum signal gives the greater playback amplitude and provides a playback signal with an improved signal-to-noise ratio and less error content.

It is necessary to observe the method of reproduction taking into account the signal amplitude of certain prepit arrays whose pit pitch is longer than those shown in FIG. 5. That is because a variety of lengths of signals have been recorded into prepit arrays on different types of disks.

Figure 6:
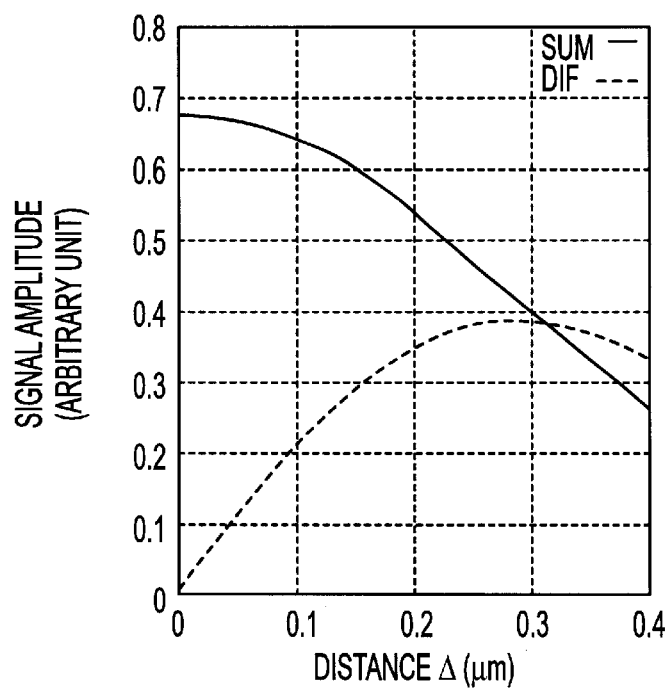
FIG. 6 is a diagram illustrating the reproduction signal amplitude when a difference and when a sum signal is derived from prepits arranged to generate a 11T/11T single-frequency signal on a current DVD-RAM with respect to the distance between the beam spot and the center line of the prepits.

FIG. 6 is a graph illustrating the relationship between the signal amplitude of the playback signal versus the distance Δ between the beam spot center line 4 and the center line C1 of the prepit array 8 where the array 8 is encoded with an 11T/11T single-frequency signal with a pit length of 2.26 μm on the current DVD-RAM. In all other respects, this test was performed under the same conditions as that of FIG. 5. It can be readily seen that both the difference signal and the sum signal are increased in peak amplitude as compared to FIG. 5 in a way that corresponds to an increase in the signal period within the prepit array 8. The difference and the sum signal amplitude curves intersect when the distance $\Delta$ is approximately 0.32 $\mu$m. The distance $\Delta$ at this intersection is slightly smaller than the distance $\Delta$ found when using the 3T/3T single-frequency signal of FIG. 5.

In view of the above-mentioned results, it can be surely said that the use of the difference signal is more advantageous for reproduction of information from prepit arrays in the case where signal $\Delta$=0.37 $\mu$m, which is the value used in the current DVD-RAMs.

When considering a high-density DVD-RAM with the density further increased to exceed that of the current DVD-RAM, it may obviously be predicted from the standpoint of increasing the recording capacity of optical disks that both the bit length and the track pitch will be decreased. Here, for purposes of convenience in explanation, let us consider a high-density DVD-RAM having its data bit length decreased from 0.41 $\mu$m (the length of the current DVD-RAM to 0.30 $\mu$m. Note that the modulation scheme used in the following tests is also the (8-16) modulation scheme.

Figure 7:
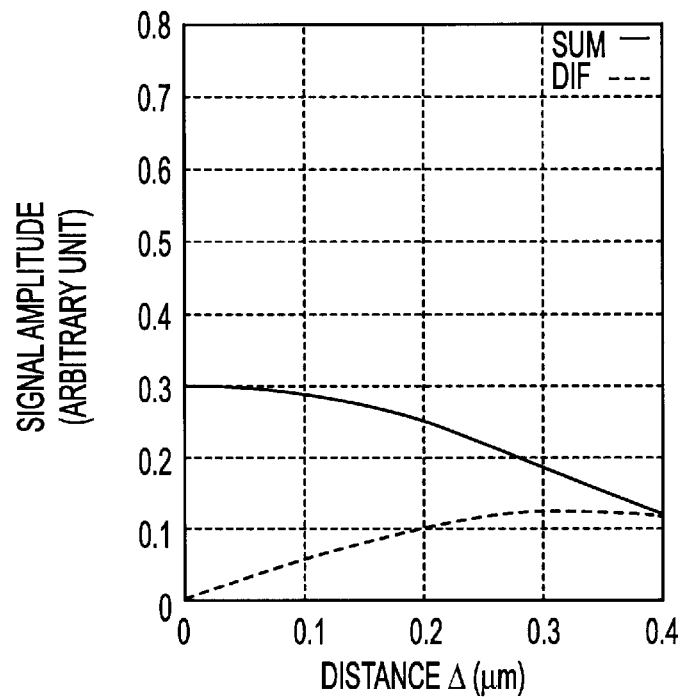
FIG. 7 is a diagram illustrating the reproduction signal amplitude when a difference and when a sum signal is derived from prepits arranged to generate a 3T/3T single-frequency signal on a high-density DVD-RAM with respect to the distance between the beam spot and the center line of the prepits.

FIG. 7 is a graph illustrating the relationship between the signal amplitude of the playback signal and the distance $\Delta$ between the beam spot path line 4 and the center line C1 of a prepit array 8 encoded with the 3T/3T single-frequency signal; a pit length of 0.45 $\mu$m and a pit depth of 70 nm; recorded using an (8-16) modulation scheme with a data bit length of 0.30 $\mu$m on a high-density DVD-RAM. In this case, both curves intersect when the distance $\Delta$ measures approximately 0.4 $\mu$m. When the distance $\Delta$ is less than 0.4 $\mu$m, the sum signal is greater in amplitude than the difference signal in any event.

Figure 8:
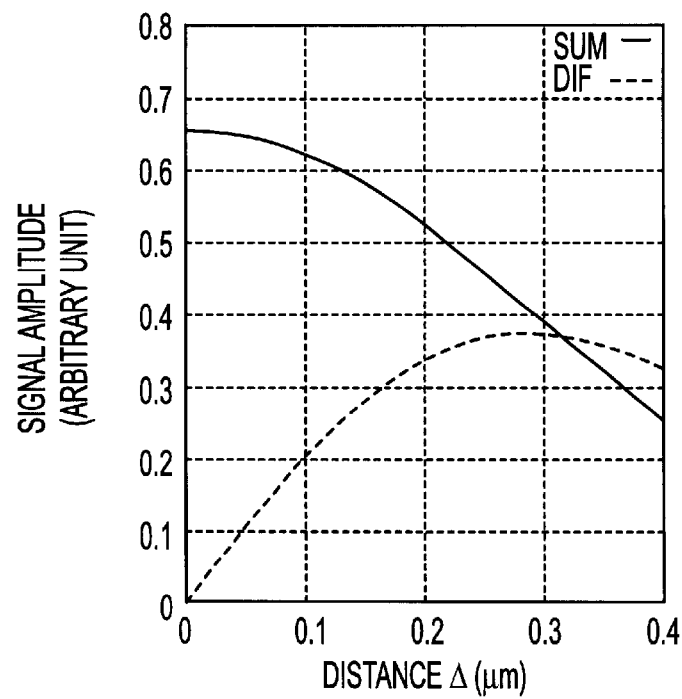
FIG. 8 is a diagram illustrating the reproduction signal amplitude when a difference and when a sum signal is derived from prepits arranged to generate an 11T/11T single-frequency signal on a high-density DVD-RAM with respect to the distance between the beam spot and the center line of the prepits.

FIG. 8 is a graph illustrating the relationship between the signal amplitude of the playback signal and the distance $\Delta$ between the beam spot path line 4 and the center line C1 of a prepit array encoded with the 11T/11T single-frequency signal; a pit length of 1.65 $\mu$m recorded using an (8-16) modulation scheme with a data bit length of 0.30 $\mu$m on a high-density DVD-RAM. This figure show similar characteristics to the result of the tests of the current DVD-RAM shown in FIG. 6. It has been well known that the signal amplitude remains unchanged even if the period is changed slightly (frequency fluctuation) when the signal period is sufficiently long. In view of this, it can be said that FIG. 8 shows an adequate result. In this case, the curves intersect when $\Delta$ measures approximately 0.31 $\mu$m.

Accordingly, in the case of the high-density DVD-RAM using an (8-16) modulation scheme with a data bit length of 0.30 $\mu$m, by selecting the sum signal under the condition of the distance $\Delta$ being less than 0.31 $\mu$m, it is possible to obtain a proper playback signal which has a greater amplitude than the difference signal over almost the entire frequency band. However, it must be taken into account when designing an optical disk apparatus that the sum will also be selected in the range of 0.31 $\mu$m<$\Delta$<0.4 $\mu$m if one believes it is important to preserve the amplitude of high-frequency signals such as the 3T/3T signals that are relatively lower in amplitude than the 11T/11T signals.

In the high-density DVD-RAM, for greater recording density, the distance $\Delta$ must be kept proportional to the track pitch, and accordingly must be kept shorter than the standardized value of approximately 0.37 $\mu$m that is used in the current DVD-RAM. This result suggests that at least when the distance $\Delta$ becomes shorter than approximately 0.31 $\mu$m, that is, in the case when the track pitch is narrower than 0.62 $\mu$m, it may be advantageous to select the sum signal as a playback signal which will have greater amplitude or improved signal-to-noise ratio.

However, in situations where one must preserve the amplitude of high-frequency signals, as stated previously, the sum signal may also be selected even when the distance $\Delta$ is approximately 0.37 $\mu$m, which is equivalent to that of the current DVD-RAM. In other words, in the figh-density DVD-RAM, the difference signal and the sum signal should alternatively be selected as the playback signal of information from the prepit array 8, according to the predetermined distance which can be set in a predetermined value in a range of approximately 0.31 $\mu$m to 0.37 $\mu$m.

From the foregoing results, when considering a system with a data bit length of less than 0.30 $\mu$m and a track pitch of less than 0.62 $\mu$m as a high-density DVD-RAM system, a signal having a higher signal-to-noise ratio may be obtained by using the sum of the signals produced by the two light-receiving areas or segments 22a and 22b of the two-segment split photo detector 21 for the playback of information from the prepit arrays 8. However, considering the importance of preserving the amplitude of the high-frequency signals, if the bit length becomes shorter, then the use of the sum signal for the playback of information from the prepit arrays 8 would be appropriate even in the high-density DVD-RAM system with the track pitch being kept at 0.74 $\mu$m, which is equivalent to that of the current DVD-RAMs.

Consequently, in the design of a DVD-RAM player, and in view of disk reproduction compatibility, it may be desirable to provide the ability to select between these signals, selecting the difference signal to be used with current DVD-RAMs to reproduce information from the prepit arrays while alternatively selecting the sum signal to be used with high-density DVD-RAMs to serve as the information playback signal. This ability to select will be extremely effective to enable the playback of information with improved signal-to-noise ratio.

Hereafter, each embodiment of an optical disk apparatus designed in accordance with the present invention will be described with reference to the accompanying drawings.

Figure 9:
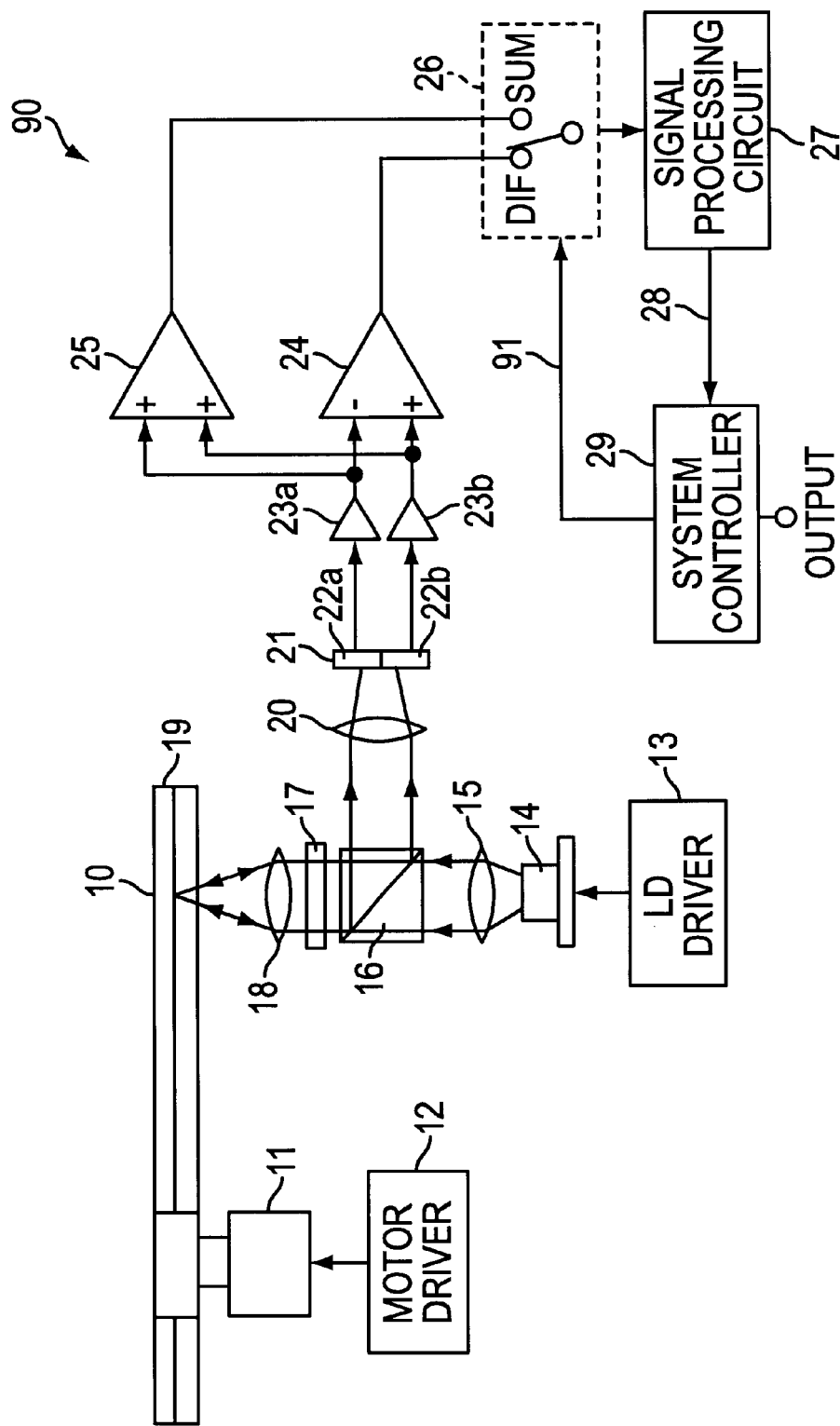
FIG. 9 is a block diagram illustrating the configuration of an optical disk apparatus in accordance with a first embodiment of the present invention.

FIG. 9 presents the configuration of an optical disk apparatus as designed in accordance with a first embodiment of the present invention. An optical disk 10, either a current DVD-RAM or one of the new, high-density DVD-RAMs, has a recording layer 19 formed on an optically transparent substrate. The recording layer 19 typically includes multiple layers, for example a protective layer and a reflective layer, etc., but the structure is not limited to those layers so long as the recording layer 19 has similar information recording characteristics when illuminated with a light beam. By way of example, either phase-changeable multiple films or magneto-optical multiple films may be used to form the recording layer 19.

Figure 1:
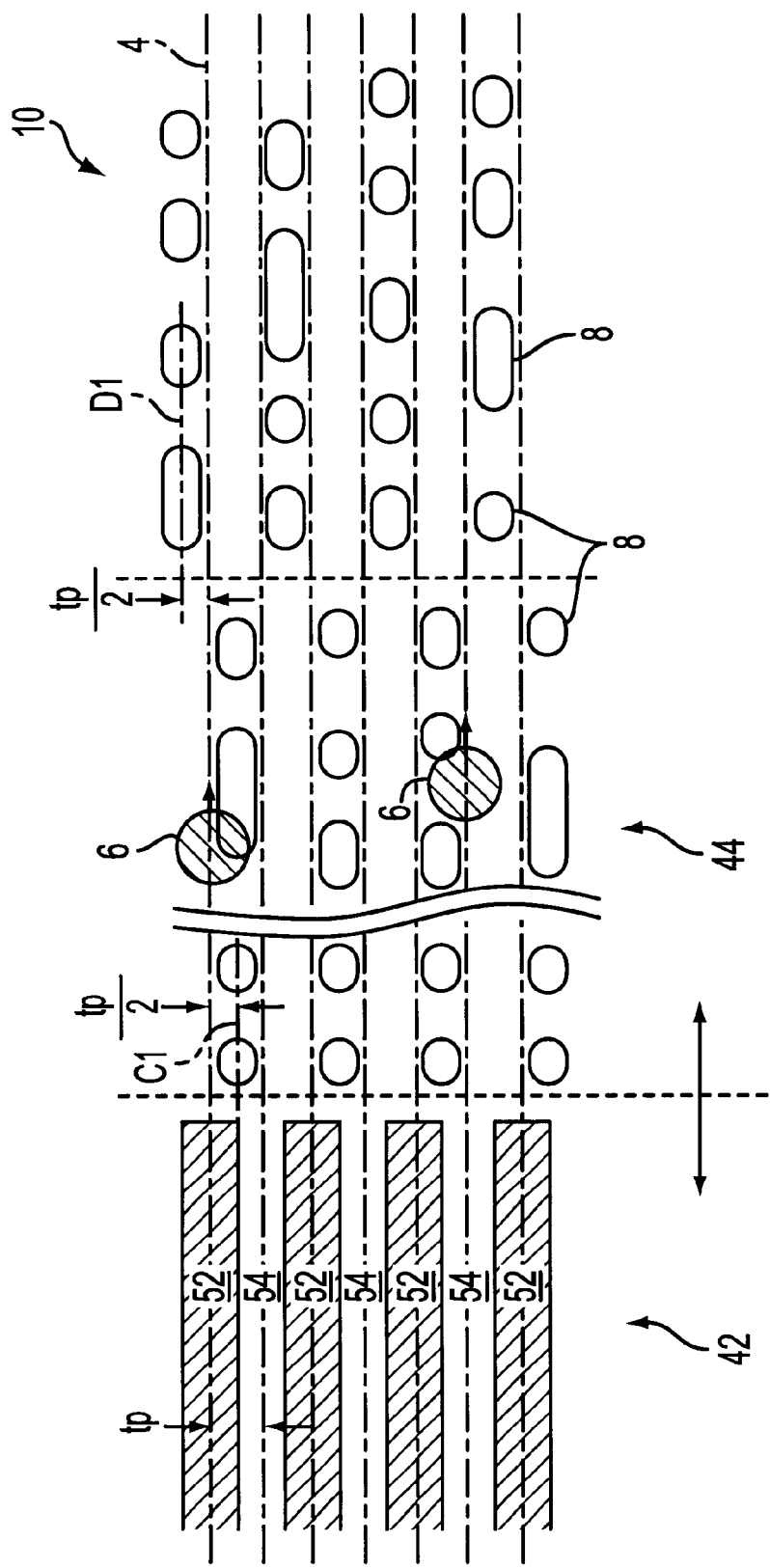
FIG. 1 is an elevational diagrammatic view of a typical current DVD-RAM illustrating the format and the information reproduction manner of the prepit header portion and the land/groove information storage portion of a typical current DVD-RAM.

As shown in FIG. 1, for example, the optical disk 10 includes recording regions 42 consisting of lands 54 and grooves 52 for use in recording various kinds of user information such as image data and sound data, etc., and a header field 44 in which address information has been recorded. Each header field stores therein certain information by using embossed pit arrays formed as prepits 8, and these prepit arrays have an optical phase difference with respect to adjacent portions of the disk 10 where the prepit arrays are not formed.

During the recording and reproducing of information, a spindle motor 11 rotates the optical disk 10 at an appropriate speed under the control of driving signals received from a motor driver 12. At the same time, a semiconductor laser such as a laser diode (LD) 14 is electrically driven by an LD driver 13 to emit a light beam. The light beam emitted from the semiconductor laser 14 is converted into a plane wave beam by a collimator lens 15, and thereafter, the plane wave light beam is guided to an objective lens 18, passing through a polarization light beam splitter (PBS) 16 and then through a quarter-quarter-wave plate 17. The light beam is then focused onto the optical disk 10 by the objective lens 18. The focusing position of the objective lens 18 is controlled by a focusing servo system (not shown) in such a way as to let the light beam form a small and fine beam spot 6 on the recording layer 19 of the optical disk 10.

Here, the semiconductor laser 14 and the objective lens 18 constitute the focusing unit of the present invention. The collimator lens 15, the polarization light beam splitter (PBS) 16, and the quarter-wave plate 17 may also be included in the focusing unit may also be included in the focusing unit.

Further, the scanning movement of the beam spot 6 is controlled by a tracking servo system (not shown) in such manner that in the recording regions 42 of the optical disk 10 the beam spot 6 scans along a locus exactly overlying the center line of the lands 54 and the grooves 52, as shown in FIG. 1, while in the header fields 44 of the optical disk 10 the beam spot scans along a locus spaced by the distance Δ in a radial direction away from the center lines C1 and D1 of the prepit arrays 8.

The light beam focused onto the recording layer 19 of the optical disk 10 is reflected by a reflecting layer in the recording layer 19, and the reflected light beam is returned to the objective lens 18 where it is converted into a plane wave beam again. The plane wave light beam passes through the quarter-wave plate 17 and is thereby polarized vertically relative to the incoming light beam; and accordingly, the light beam can then be reflected by the polarization light beam splitter 16. The resultant light beam reflected by the polarization light beam splitter 16 is converted by a condensing lens 20 onto a photo detector 21 which constitutes a detecting unit.

The photo detector 21 has at least two detecting areas 22a and 22b which are divided by at least one divisional line extending parallel to a line tangent to the information track. The reflected light beam directed onto the photo detector 21 is subject to photoelectric conversion and thus causes the detecting areas 22a and 22b to generate and output independent electrical current signals that are substantially proportional to the optical power of the incident light beam that reaches the respective detecting areas 22a and 22b.

The current signals output from the photo detector 21 which correspond to the detecting areas 22a and 22b are converted by current-to-voltage converting amplifiers 23a and 23b into voltage signals 6 which are then fed into the inverted and non-inverted inputs of a differential amplifier 24. These same two voltage signals are also fed input to two input terminals of a sum amplifier 25.

Accordingly, the difference amplifier 24 outputs a signal proportional to the difference between the optical power of the incident light beam portions reaching the detecting areas 22a and 22b of the photo detector 21, and the sum amplifier 25 outputs a signal proportional to the sum of the optical power of the incident light beam portions reaching the detecting areas 22a and 22b of the photo detector 21.

The difference signal and the sum signal, which are output from the difference amplifier 24 and the sum amplifier 25 respectively, are then fed into a signal processing circuit 27 in such a way that either one of them maybe selected by a difference/sum selection switch 26. The difference/sum select switch 26 is controlled by a switch control signal 91, as shown in FIG. 9, supplied by a system controller 29, thereby selecting either the difference signal input into a terminal DIF or the sum signal input into a terminal SUM.

The one of the difference and the sum signals selected by the difference/sum select switch 26 is fed into the signal processing circuit 27 as the playback signal for use in conveying the information recovered from the prepits. The signal processing circuit 27 effectuates appropriate processing, including equalization and analog-to-digital conversion of the analog playback signal provided by the difference/sum select switch 26 and thereby outputs the reproduced information corresponding to the prepits on the optical disk 10.

Although FIG. 9 shows only a system for reproducing information encoded in the prepits 8 in the header field 44 of the optical disk 10 at the stage following the photo detector 21, in an actual optical disk playback apparatus user information such as images, audio, and various kinds of data and the like can be recorded in the recording region 42, including the lands 54 and grooves 52 in the case of the illustrative disk format of the current DVD-RAM illustrated in FIG. 1, by way of example. Thus, the optical disk apparatus as is also designed to reproduce such user information. In the recording region 42, a beam spot 6 converged onto the optical disk 10 scans the locus overlying the track center line of the lands 54 and the grooves 52. Thus, it becomes possible to reproduce the user information recorded in the recording regions 42 by employing the sum of the output signals provided by the photo detector 21 (which signals correspond to the two light-receiving areas 22a and 22b) as a playback signal, and then allowing the signal processing circuit 26 to likewise perform the required processing, such as equalization, A-to-D conversion, and the like, with respect to this playback signal.

Further, in the actual optical disk apparatus 90, a focusing error signal and a tracking error signal are needed to enable the performance of the prescribed focusing servo operations and tracking servo operations. In this respect, the focusing error signal and the tracking error signal are obtainable by adequately modifying the configuration of the photo detector 21 to thereby effectuate certain operational processing with respect to the output signals corresponding to a plurality of light-receiving areas within the photo detector 21.

Next, an explanation will be given of a method for controlling the difference/sum select switch 26.

In the illustrative embodiment, one specific method will be described which includes the step of first recognizing the track pitch by examining physical format information that has been prerecorded in a lead-in area of the optical disk 10. Based upon this information, the step of changing the reproduction scheme during the playback of information from the prepits in the header field by controlling the difference/sum select switch 26 can alternatively be enabled.

More specifically, upon the loading of the optical disk 10 into the optical disk apparatus 90, this lead-in area is played back first. It contains information prerecorded as prepits by the disk manufacturer. In this lead-in area, physical format data, including the size of the optical disk 10 and the recording density as well as the track pitch, etc., has been recorded. The fundamental information defining the nature of optical disk 10 is obtainable by the playback of the lead-in area information.

Additionally, insofar as the embossed pits formed on the lead-in area are concerned, the center line of the pits is not shifted relative to the line of travel of the beam spot 6 in the disk radial direction as shown in FIG. 1, and as with the pits of a current CD and a current DVD-ROM, the pits are formed in such a manner as to define a single spiral line on the optical disk 10, through this area.

Accordingly, in the lead-in area on the optical disk 10, tracking control is performed in a way such that the beam spot scans along the center line of the pits, and during signal reproduction, the sum signal from the sum amplifier 25 is used to play back the physical format information from the pits in this lead-in area. In other words, during playback of the lead-in area immediately after loading the optical disk 10, the system controller 29 controls the switch control signal 91 to cause the difference/sum select switch 26 to select the terminal SUM and the sum signal.

The signal reproduced from the lead-in area in this manner is subjected to equalization and to A-to-D conversion, etc., by the signal processing circuit 27 to provide a processed signal which is then input as binary data 28 to the system controller 29. In turn, the system controller 29 performs demodulation processing of this binary data 28 to extract from it the physical format information recorded in the lead-in area. The system controller 29 determines from certain data contained within this physical format information the track pitch and whether the optical disk 10 is a current DVD-RAM or a new high-density DVD-RAM. In accordance with this information, the system controller 29 determines in which of two ways to manipulate the switch control signal 91 which is supplied and which controls the difference/sum select switch 26. These two different ways of manipulating the switch are shown in FIG. 10.

Figure 10A:
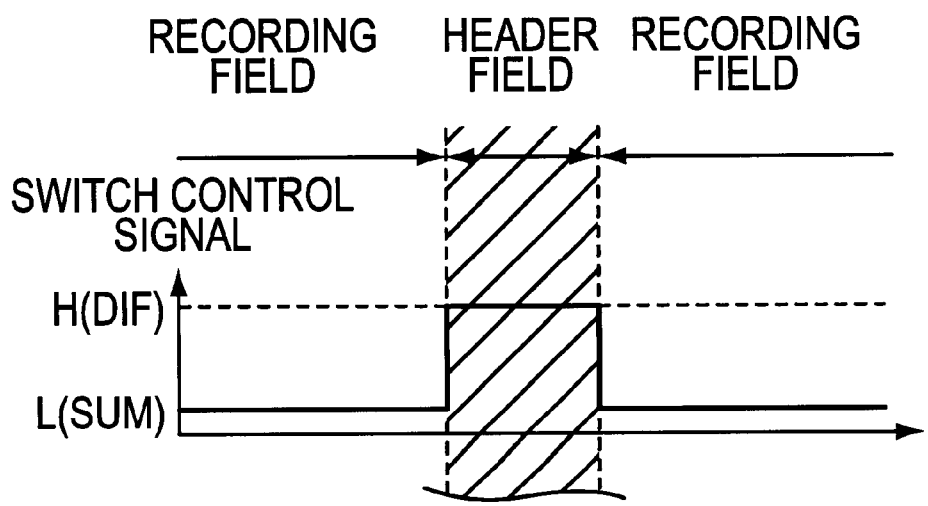
FIGS. 10A and 10B are diagrams illustrating the switch control signals used for the current DVD-RAM (FIG. 10A) and for the high-density DVD-RAM (FIG. 10B) fluctuating in a manner that distinguishes when a data recording field or a header field on the optical disk is being scanned in the case of the high-density DVD-RAM.
Figure 10B:
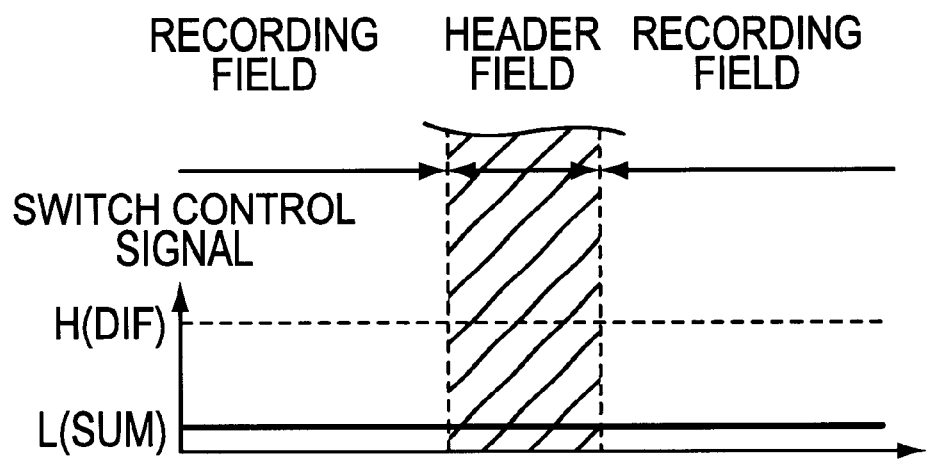

More specifically, control of the switch control signal is carried out in a manner such that where the optical disk 10 is of the current DVD-RAM type, the sum (SUM) is selected when scanning the recording region 42 while the difference signal (DI) is selected when scanning the header field 44 as is shown in FIG. 10A. Alternatively, if the optical disk 10 is a high-density DVD-RAM, then the sum signal (SUM) is selected for both the recording region 42 and the header field 44, as is shown in FIG. 10B.

One typical method for use with the system controller 29 in determining whether the optical disk 10 is a current DVD-RAM or a high-density DVD-RAM is as follows: Practically, as stated previously, where the wavelength of the semiconductor laser 14 is 640 nm and the numerical aperture (NA) of the objective lens 18 is 0.6, by way of example, one may determine the disk to be a current DVD-RAM when the distance $\Delta$ is more than 0.31 $\mu$m (the track pitch is accordingly 0.62 $\mu$m); alternatively, when the distance $\Delta$ is less than 0.31 $\mu$m, one may determine it to be a high-density DVD-RAM.

In the explanation as described above, the track pitch was used to determine whether the optical disk 10 is a current DVD-RAM or a high-density DVD-RAM. But there may have also been recorded within the physical format information certain data capable of directly indicating which of the difference signal and the sum signal should be used during reproduction of the header field 44 of such an optical disk 10.

Figure 11:
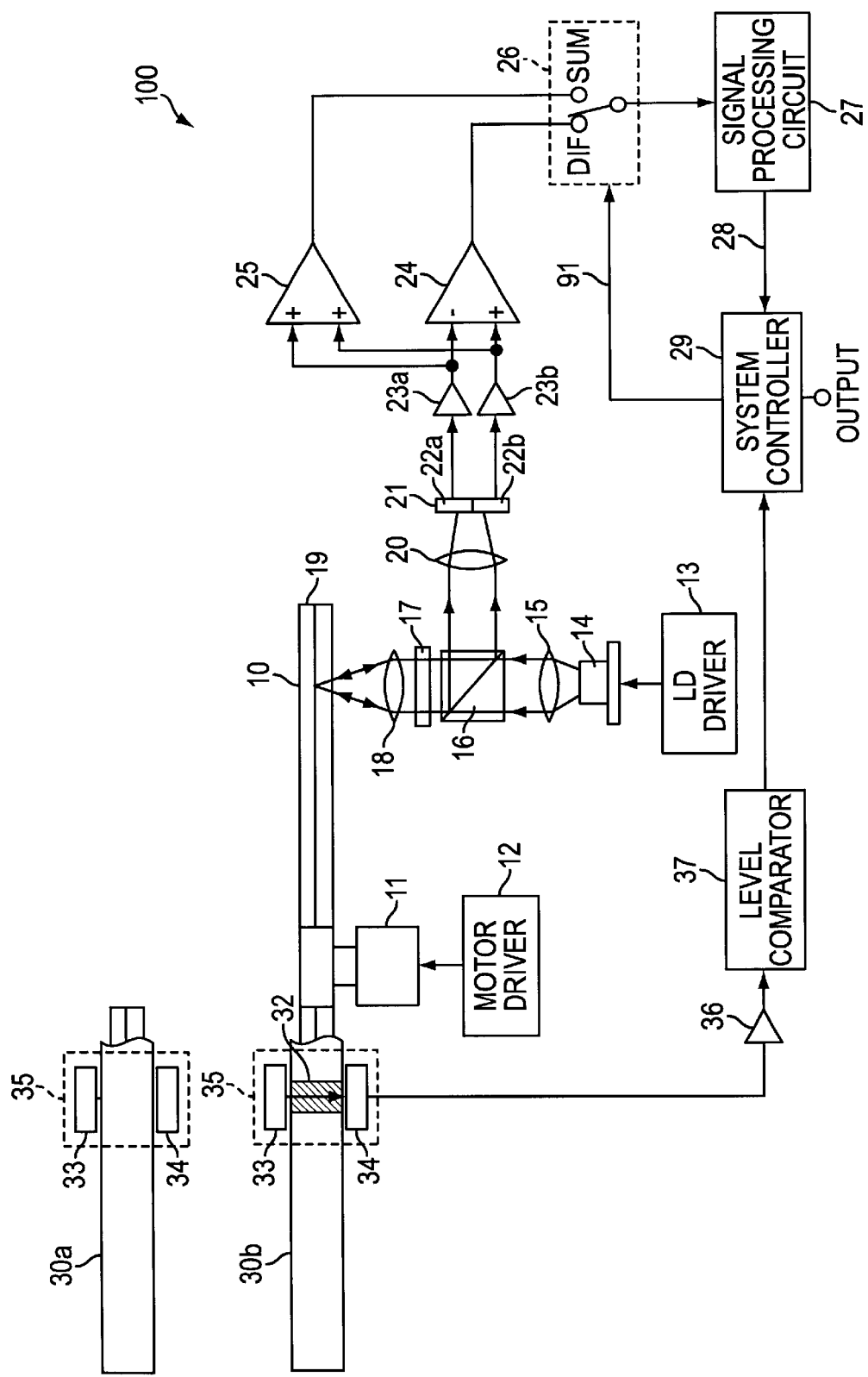
FIG. 11 is a block diagram illustrating the configuration of an optical disk apparatus in accordance with a second embodiment of the present invention.

FIG. 11 presents the configuration of an optical disk apparatus 100 designed in accordance with a second embodiment of the present invention. It differs from the first embodiment in that the second embodiment includes a different mechanism for determining whether the optical disk 10 is a current DVD-RAM or a new high-density DVD-RAM.

More specifically, in this embodiment a disk cartridge 30a, 30b storing the optical disk 10 is arranged to be different in physical shape to thereby differentiate between current DVD-RAMs and the new high-density DVD-RAMs, thereby enabling the type of the optical disk 10 to be determined. Practically, as shown in FIG. 11, a disk cartridge 30b containing a high-density DVD-RAM is provided, for example, with a cut-away 32 which is absent from a disk cartridge 30a containing a current DVD-RAM. Simultaneously, a disk-determining detector unit 35 is provided inside of the optical disk apparatus 100. The disk determining detector unit 35 includes a light-emitting element 33 and a light-receiving element 34 set in opposition, with the optical disk 10 being placed between them.

With such an arrangement, upon loading of a current DVD-RAM, the emitted light from the light-emitting element 33 is blocked by the disk cartridge 30a and is prevented from arriving at the light-receiving element 34. Alternatively, when a high-density DVD-RAM is loaded, the emitted light from the light-emitting element 33 passes through the cut-away 32 in the disk cartridge 30b and reaches the light-receiving element 34. The output signal from the light-receiving element 34 is amplified by an amplifier 36 which causes its output voltage to change depending on whether the optical disk 10 is a current DVD-RAM or a high-density DVD-RAM. The output voltage of this amplifier 36 is then binary-encoded into a high or low binary signal by an associated level comparator 37 to switch from high to low (and vice versa) at a predefined voltage level, whereby the output of the level comparator 37 changes so that it is at a low level whenever a current DVD-RAM is present and at a high level whenever a high-density DVD-RAM is present, by way of example.

In response to this signal, the system controller 29 is advised of whether the optical disk 10 presently being loaded in the optical disk apparatus is a current DVD-RAM or a high-density DVD-RAM. The controller 29 may then determine in which manner to control of the switch control signal 91 that is supplied to the difference/sum select switch 26, in accordance with FIG. 10, in the same manner as it did in the first embodiment.

Although in the first and the second embodiments one specific type of optical disk was presented as the optical disk 10 wherein the spot 6 line of travel was shifted in the disk radial direction so that the center line of the prepits in the header field is placed at a locus overlying an extension line of the boundary line between the lands and the grooves, as shown in FIG. 1, the principles of the invention as disclosed herein may also be applied to an optical disk in which the prepits in the header fields are so formed as to cause the center line to be placed at a locus that overlies the track center line of the lands and the grooves.

In the case of such an optical disk, in the header field a beam spot scans along the center line of the prepit arrays, and thus the distance $\Delta=0$. Therefore, the sum may be selected as the best playback signal in the case of playing back the information recorded using the prepits in the header fields of this type of optical disk.

In the above embodiments, an optical disk on which embossed pits are formed as prepit arrays. However, the mark arrays having an optical phase difference relative to the non-mark regions, for example, can be formed as prepit arrays.

Accordingly, this invention makes it possible to provide an optical disk apparatus capable of obtaining a better playback signal and greater signal amplitude even with a plurality of different types of optical disks that are different in track pitch, for example due to difference in recording density, when reproducing information by using the light beam to scan certain lines spaced apart by a predefined distance from the center of the prepits having an optical phase difference relative to the recording regions.

The foregoing discussion discloses and describes merely an exemplary embodiment of the present invention. As will be understood by those skilled in the art, the present invention may be embodied in other specific forms without departing from its true spirit or its essential characteristics. Accordingly, this description of the present invention is intended to be illustrative, but not limiting, of the scope of the invention, which is set forth in the following claims. The entire contents of Japanese Patent Application H10-072301, filed Mar. 20, 1998, is incorporated herein by reference.

What is claimed is:

1. An optical disk apparatus for reproducing information from an optical recording medium, comprising:
    a light emitting unit that focuses a light beam onto the optical recording medium;
    a detecting unit that detects the light beam reflected by the optical recording medium;
    a processing unit that processes a signal generated by the detecting unit and outputs a processed signal that reproduces the recorded information;
    wherein the optical recording medium has reproducible information formed as mark arrays which have an optical phase difference with respect to adjacent portions of the mark arrays;
    the light emitting unit focuses the light beam along a line shifted away from the center lines of the mark arrays by a predetermined distance in a radial direction with respect to the center of the optical recording medium;
    the detecting unit has a detecting surface which is divided into at least two detecting areas by at least one divisional line parallel to the center line of the mark arrays;
    the processing unit is capable of computing the difference between and the sum of signals originating in the detecting areas, and outputs as the processed signal one or the other of those computed values to reproduce information of the mark arrays in accordance with a characteristic of the optical recording medium wherein the processing unit outputs as the processed signal the difference signal in the case when the optical recording medium has the characteristic in which the predetermined distance is longer than a predetermined value, and outputs the sum signal as the processed signal in the case when the optical recording medium has the characteristic in which the predetermined distance is shorter than the predetermined value.

2. The optical disk apparatus according to claim 1, wherein the predetermined value is approximately 0.31 to 0.37 micrometer.

3. The optical disk apparatus according to claim 1, wherein the processing unit outputs as the processed signal the difference signal in the case when the optical recording medium has the characteristic in which the distance between the adjacent tracks is a predetermined value, and outputs the sum signal as the processed signal in the case when the optical recording medium has the characteristic in which the distance between the adjacent tracks is shorter than the predetermined value.

4. An optical disk apparatus for reproducing information from an optical recording medium, comprising:
    a light emitting unit that focuses a light beam onto the optical recording medium;
    a detecting unit that detects the light beam reflected by the optical recording medium;
    a processing unit that processes a signal generated by the detecting unit and outputs a processed signal that reproduces the recorded information;
    wherein the optical recording medium has a first area on which rewritable information can be stored along a first line and a second area on which reproducible information is stored along second lines formed as mark arrays which have an optical phase difference with respect to adjacent portions of the mark arrays,
    the second lines being shifted away from the first line by a predetermined distance;
    the light emitting unit focuses the light beam along the first line;
    the detecting unit has a detecting surface which is divided into at least two detecting areas by at least one divisional line parallel to the first line and the second lines; and
    the processing unit is capable of computing the difference between and the sum of signals originating in the detecting areas, and outputs as the processed signal one of the difference and the sum signal by taking into consideration the difference between the first and second areas, wherein the processing unit outputs as the processed signal the sum signal for reproduction of information in the first area, and the processing unit outputs one of the difference and the sum signal for reproduction of information in the second area.

5. The optical disk apparatus according to claim 4, wherein the processing unit outputs as the processed signal in the second area the difference signal in the case when the optical recording medium has the characteristic in which the predetermined distance is longer than a predetermined value, and outputs the sum signal as the processed signal in the second area in the case when the optical recording medium has the characteristic in which the predetermined distance is shorter than the predetermined value.

6. The optical disk apparatus according to claim 5, wherein the predetermined value is approximately 0.31 to 0.37 micrometer.

7. The optical disk apparatus according to claim 4, wherein the processing unit outputs as the processed signal in the second area the difference signal in the case when the optical recording medium has the characteristic in which the distance between the adjacent tracks in the first area is a predetermined value, and outputs the sum signal as the processed signal in the second area in the case when the optical recording medium has the characteristic in which the distance between the adjacent tracks in the first area is shorter than the predetermined value.

8. An optical disk apparatus for reproducing information from an optical recording medium, the optical recording medium having a first area on which rewritable information can be stored along a first line and a second area on which reproducible information is stored along second lines formed as mark arrays which have an optical phase difference with respect to adjacent portions of the mark arrays, the second lines being shifted away from the first line by a predetermined distance, comprising;
    a light emitting irradiating unit that focuses a light beam onto the optical recording medium;

a detecting unit that detects the light beam reflected by the optical recording medium;

a processing unit that processes a signal generated by the detecting unit and outputs a processed signal that reproduces the information;

wherein the light emitting unit focuses the light beam along the first line;

the detecting unit has a detecting surface which is divided into at least two detecting areas by at least one divisional line parallel to the first line and the second lines; and the processing unit is capable of computing the difference between and the sum of signals originating in the detecting areas, and outputs as the processed signal one of the difference and the sum signal by taking into consideration the difference between the first and second areas, wherein the processing unit outputs as the processed signal the sum signal for reproduction of information in the first area, and the processing unit outputs one of the difference and the sum signal for reproduction of information in the second area.

9. The optical disk apparatus according to claim 8, wherein the processing unit outputs as the processed signal in the second area the difference signal in the case when the optical recording medium has the characteristic in which the predetermined distance is longer than a predetermined value, and outputs the sum signal as the processed signal in the second area in the case when the optical recording medium has the characteristic in which the predetermined distance is shorter than the predetermined value.

10. The optical disk apparatus according to claim 9, wherein the predetermined value is approximately 0.31 to 0.37 micrometer.

11. The optical disk apparatus according to claim 8, wherein the processing unit outputs as the processed signal in the second area the difference signal in the case when the optical recording medium has the characteristic in which the distance between the adjacent tracks in the first area is a predetermined value, and outputs the sum signal as the processed signal in the second area in the case when the optical recording medium has the characteristic in which the distance between the adjacent tracks in the first area is shorter than the predetermined value.

12. A method of reproducing information from an optical recording medium, the optical recording medium having a first area on which recordable information can be stored along a first line and a second area on which reproduction control information is stored along a second line, the second line spaced apart from the first line by a predetermined distance, comprising the steps of:

focusing a light beam onto the optical recording medium;

detecting the intensity of the light beam reflected by the optical recording medium;

processing the light intensities obtained by the detection step to extract the information for reproduction;

wherein the focusing step focuses the light beam along the first line;

the detecting step detects the reflected light beam in a plurality of detecting areas which are on opposite sides of a reflected image of the first line location; and the processing step computes the difference between and the sum of the light intensities detected in the detecting step and presents the sum or the difference as the information for reproduction in accordance with a characteristic of the optical recording medium, wherein the processing unit outputs as the processed signal the difference signal in the case when the optical recording medium has the characteristic in which the predetermined distance is longer than a predetermined value, and outputs the sum signal as the processed signal in the case when the optical recording medium has the characteristic in which the predetermined distance is shorter than the predetermined value.

13. The method according to claim 12, wherein the processing unit outputs as the processed signal the difference signal in the case when the optical recording medium has the characteristic in which the distance between the adjacent tracks is a predetermined value, and outputs the sum signal as the processed signal in the case when the optical recording medium has the characteristic in which the distance between the adjacent tracks is shorter than the predetermined value.

* * * * *